US008929064B2

(12) United States Patent
Ho et al.

(10) Patent No.: US 8,929,064 B2
(45) Date of Patent: Jan. 6, 2015

(54) CARRIER, HOST, AND METHOD OF ASSEMBLING THE HOST

(75) Inventors: Chin-Ching Ho, Taipei (TW); Jim C C Huang, Taipei (TW); Edgar Tsai, Taipei (TW); Morgan Y L Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 13/273,356

(22) Filed: Oct. 14, 2011

(65) Prior Publication Data

US 2012/0106046 A1 May 3, 2012

(30) Foreign Application Priority Data

Oct. 29, 2010 (TW) ................ 99137347 A

(51) Int. Cl.
G06F 1/16 (2006.01)
G06F 1/18 (2006.01)
G11B 33/12 (2006.01)

(52) U.S. Cl.
CPC .............. *G11B 33/128* (2013.01); *G06F 1/187* (2013.01)
USPC .................... 361/679.35; 361/818; 312/223.2

(58) Field of Classification Search
CPC ....... G06F 1/187; G06F 13/409; G06F 1/184; G06F 1/185; G06F 1/186; H05K 7/1425; H05K 7/1489; H05K 9/0016; H05K 9/0062; H05K 5/0256; H05K 7/1409; H05K 7/1424; H05K 3/4015; H05K 1/0393
USPC ................. 361/724–727, 816, 818, 361/679.33–679.39, 679.01, 679.02; 174/35 R, 35 GC; 29/428; 220/752

See application file for complete search history.

(56) References Cited

U.S. PATENT DOCUMENTS 5,588,728 A 12/1996 Eldridge et al.
7,280,352 B2 10/2007 Wilson et al.
(Continued)

FOREIGN PATENT DOCUMENTS

CN 201440335 U 4/2010
TW M357640 U1 5/2009
TW M383180 U1 6/2010

OTHER PUBLICATIONS

EMC Corporation, "EMC CLARiiON—2-Gigabit Disk-Array Enclosure (DAE2) FC and ATA Models", Hardware Reference P/N 014003048, Rev A05, Copyright © 2002-2004 EMC Corporation. All rights reserved., Published Jan. 2004, 78 pages.

(Continued)

*Primary Examiner* — Anthony Haughton
*Assistant Examiner* — Ingrid Wright
(74) *Attorney, Agent, or Firm* — Katherine S. Brown; Jeffrey L. Streets

(57) ABSTRACT

A carrier includes main body, a conductive elastic element, and a handle. The main body is adapted to carrying an electronic device and has a cavity. The conductive elastic element is disposed in the cavity. The handle is pivotally coupled to the main body. When the handle locks the main body to be located in a lock position, the handle exerts force on the conductive elastic element such that the conductive elastic element protrudes outside the main body through the cavity. When the handle does not lock the main body and exert force on the conductive elastic element to be located at a release position, the conductive elastic element is located inside the main body where it does not interfere with an outside device. This allows convenient insertion and removal of the carrier relative to a cage. Accordingly, the conductive elastic element is not damaged easily.

16 Claims, 7 Drawing Sheets

(56) References Cited

U.S. PATENT DOCUMENTS

| | | | |
|---|---|---|---|
| 7,321,489 B2 | 1/2008 | McAlister | |
| 7,626,810 B1 | 12/2009 | Kim et al. | |
| 7,782,606 B2 * | 8/2010 | Baker et al. | 361/679.39 |
| 7,881,052 B2 * | 2/2011 | Crippen et al. | 361/679.37 |
| 8,004,830 B2 | 8/2011 | Lu | |
| 8,009,425 B2 | 8/2011 | Kang | |
| 2008/0094794 A1 | 4/2008 | Hass | |
| 2008/0205026 A1 | 8/2008 | Gallarelli et al. | |
| 2009/0279248 A1 | 11/2009 | Baker et al. | |
| 2010/0149746 A1 | 6/2010 | Crippen et al. | |
| 2010/0165564 A1 | 7/2010 | Lu | |
| 2010/0284145 A1 | 11/2010 | Kang | |

OTHER PUBLICATIONS

Wistron Corp, "Quick-detachable fixing structure and carrying base structure and computer system thereof" English Abstract of TWM357640, Espacenet—Bibliographic data, May 21, 2009, 1 page.

Hongfujin Prec Ind Shenzhen et al., "Hard disk drive withdrawing structure" English Abstract of CN201440335, Espacenet—Bibliographic data, Apr. 21, 2010, 1 page.

* cited by examiner

CARRIER, HOST, AND METHOD OF ASSEMBLING THE HOST

CROSS REFERENCE TO RELATED APPLICATIONS

This application claims the right of priority based on Taiwan Patent Application No. 99137347 entitled "CARRIER, HOST, AND METHOD OF ASSEMBLING THE HOST" filed on Oct. 29, 2010, which is incorporated herein by reference.

BACKGROUND OF THE INVENTION

1. Field of the Invention

The present invention relates to a carrier, and more particularly relates to a carrier for carrying an electronic device to be installed on a host device and a method of assembling the host device.

2. Background of the Related Art

FIG. 1 is a perspective view of a conventional carrier carrying a hard disk drive. Referring to FIG. 1, a conventional carrier 100 comprises a main body 110, a plurality of conductive elastic elements 120, and a handle 130. The main body 110 is adapted to carry a hard disk drive 10, and comprises two holding members 112 and a connecting member 114. The connecting member 114 connects the holding members 112. The holding members 112 are disposed opposite to each other. The hard disk drive 10 is disposed in an accommodating space S1 formed by the connecting member 114 and the holding members 112. Furthermore, the conductive elastic elements 120 are disposed at the connecting member 114 of the main body 110 and protrude outside the main body 110. The handle 130 is pivoted to the connecting member 114 of the main body 110.

FIG. 2 is a perspective view of the conventional carrier 100 of FIG. 1 carrying the hard disk drive and disposed in a cage. The cage 20 can accommodate a plurality of the carriers 100 carrying the hard disk drives 10. When the carriers 100 are disposed in the cage 20, the conductive elastic elements 120 of each of the carriers 100 are compressed and contact the cage 20 so as to prevent electromagnetic interference (EMI).

However, since the conductive elastic elements 120 of each of the carriers 100 protrude outside the main body 110, it is necessary for an assembly worker to exert a relatively great force on each of the carriers 100 to push each of the carriers 100 into a predetermined position or pull each of the carriers 100 from the predetermined position when the assembly worker want to insert the carriers 100 into the cage 20 or detach the carriers 100 from the cage 20. Hence, it is easy to damage the conductive elastic elements 120 of each of the carriers 100. To solve the aforesaid problem, a relatively large clearance must be kept between the portion of the cage 20 that is designed to contact the conductive elastic elements 120, and each of the carriers 100. However, by providing greater clearance, on the whole, the cage 20 occupies more space.

BRIEF SUMMARY OF THE INVENTION

One embodiment of the invention provides a carrier for carrying an electronic device. The carrier comprises a main body being adapted to carrying the electronic device and having at least one cavity; at least one conductive elastic element disposed at the cavity; and a handle pivotally coupled to the main body. When the handle locks the main body to be located in a lock position, the handle exerts force on the conductive elastic element an causes the conductive elastic element to protrude outside the main body through the cavity. When the handle does not lock the main body and exert force on the conductive elastic element to be located in a release position, the conductive elastic element is located inside the main body.

Another embodiment of the invention provides a host comprising a cage and at least one assembly detachably disposed in the cage, wherein the at least one assembly comprises an electronic device and a carrier. The carrier comprises a main body carrying the electronic device and having a cavity, at least one conductive elastic element disposed in the cavity, and a handle pivotally coupled to the main body. When the assembly is located in the cage and the handle locks the main body to be located in a lock position, the handle exerts force on the conductive elastic element such that the conductive elastic element protrudes outside the main body through the cavity and contacts the cage. When the handle does not lock the main body and exert force on the conductive elastic element to be located at a release position, the conductive elastic element is located inside the main body such that the assembly is adapted to being detached from the cage.

Yet another embodiment of the invention provides a method of assembling a host. The method comprises providing a cage; providing an assembly comprising an electronic device and a carrier, wherein the carrier comprises a main body, at least one conductive elastic element and a handle, wherein the main body carries the electronic device and has a cavity, the conductive elastic element is disposed in the cavity, and the handle is pivotally coupled to the main body; setting the handle at a release position, wherein the handle does not lock the main body and exert force on the conductive elastic element such that the conductive elastic element is located inside the main body; pushing the assembly into the cage with the handle in the release position; and setting the handle in a lock position with the assembly in the cage, wherein the handle locks the main body and exerts force on the conductive elastic element such that the conductive elastic element protrudes outside the main body through the cavity and contacts the cage.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present invention will be further understood by means of referring to the following description and the appended claims or using the following embodiments of the present invention.

DETAILED DESCRIPTION OF THE INVENTION

Figure 1:
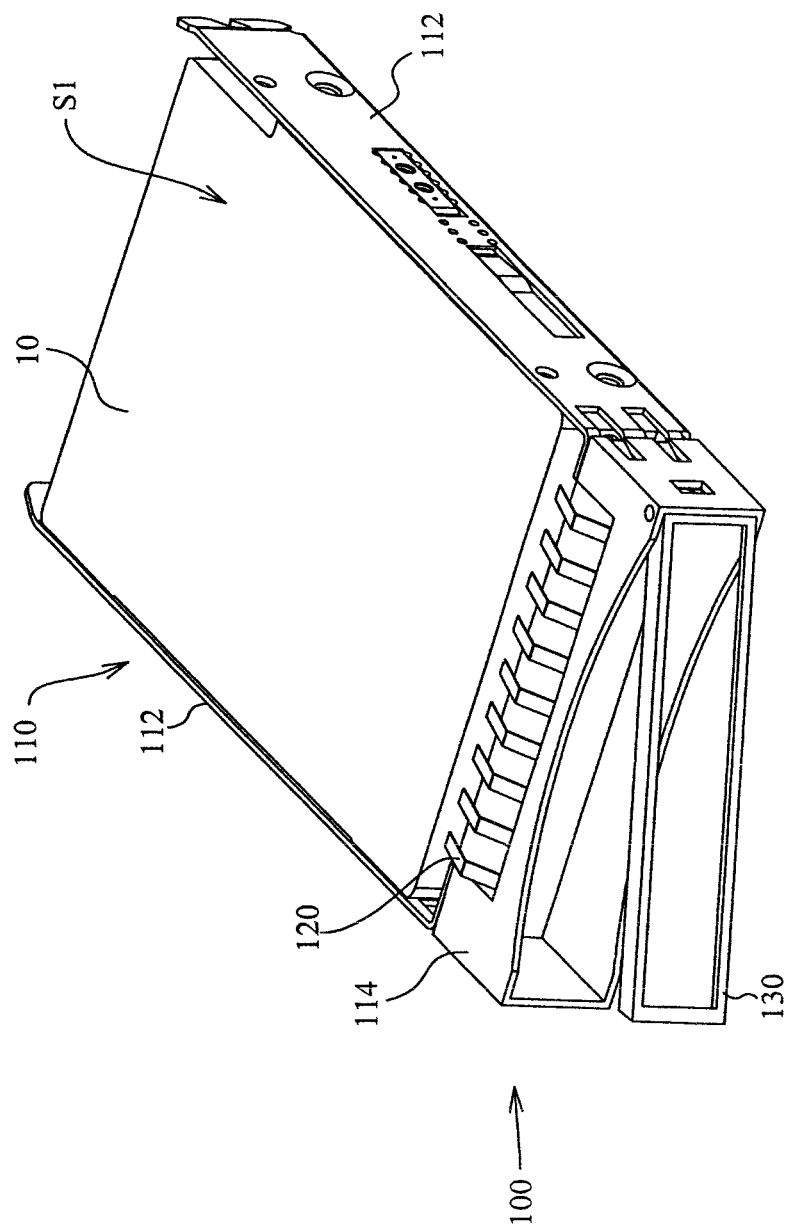
FIG. 1 is a perspective view of a conventional carrier carrying a hard disk drive.
Figure 2:
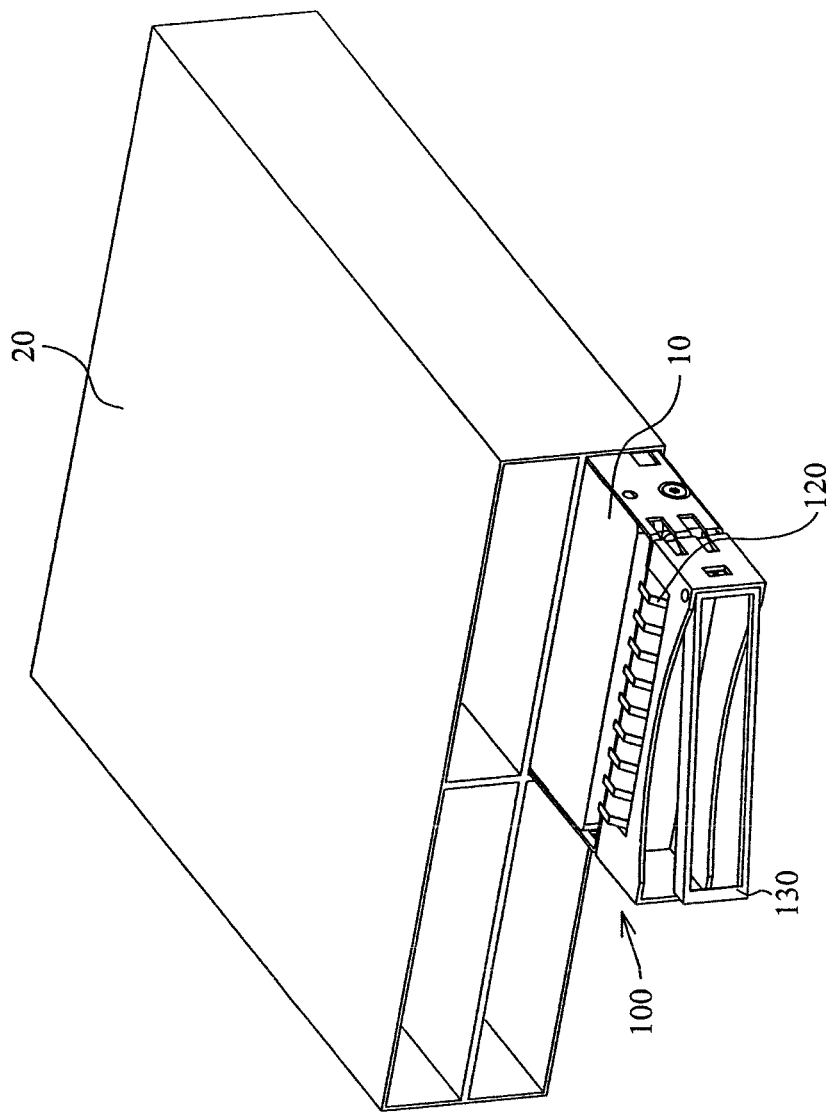
FIG. 2 is a schematically perspective view of a carrier of FIG. 1 carrying the hard disk drive and disposed in a cage.

The present invention provides a carrier having a conductive elastic element which can be optionally located inside the main body. The present invention further provides a host having the carrier. The host is, for example, a computer server. The present invention further provides a method of assembling the host, wherein the conductive elastic element is optionally located inside the main body during a time period in which the carrier is installed at a predetermined position.

The present invention provides a carrier adapted to carrying an electronic device. The carrier includes a main body, at least one conductive elastic element and a handle. The main body is adapted to carrying the electronic device and has at least one cavity. The conductive elastic element is disposed at the cavity. The handle is pivoted to the main body. The carrier optionally has the following operation modes: lock mode and release mode. The lock mode is when the handle locks the main body to be located in a lock position, and the handle exerts force on the conductive elastic element such that the conductive elastic element protrudes outside the main body through the cavity. The release mode is when the handle does not lock the main body and exert force on the conductive elastic element to be located in a release position, and the conductive elastic element is located inside the main body.

In an embodiment of the present invention, the carrier further comprises a pressing element. The main body has a plurality of the cavities and the carrier has a plurality of the conductive elastic elements. The pressing element is disposed at the main body and contacts the conductive elastic elements. The handle exerts force on the pressing element such that the pressing element presses the conductive elastic elements when the handle is at the lock position.

In an embodiment of the present invention, the handle has a first pivoting portion and a second pivoting portion. The first pivoting portion locks the second pivoting portion and the main body and at least one of the first pivoting portion and the second pivoting portion exerts force on the conductive elastic element when the handle is at the lock position.

In an embodiment of the present invention, the conductive elastic element comprises a first flexible bending portion and a second flexible bending portion connected to the first flexible bending portion. The bending status of the first flexible bending portion changes and the second flexible bending portion protrudes outside the main body through the cavity when the handle is at the lock position.

In an embodiment of the present invention, the main body comprises two holding members and a connecting member. The connecting member connects the holding members. The holding members are disposed opposite to each other. The electronic device is adapted to being disposed in an accommodating space formed by the connecting member and the holding members. The cavity is located at the connecting member. The conductive elastic element is disposed at the connecting member, and the handle is pivoted to the connecting member.

The present invention also provides a host including at least one assembly and a cage. The assembly is detachably disposed in the cage. The assembly includes the carrier and the electronic device carried by the carrier. When the assembly is located in the cage and the handle is at the lock position, the conductive elastic element contacts the cage. When the handle is at the release position, the assembly is adapted to being detached from the cage.

The present invention also provides a method of assembling the host including the following steps. First, the cage is provided. Next, the assembly is provided. Next, the handle is set at the release position. Next, the assembly having the handle being at the release position is pushed into the cage. Thereafter, the handle is set at the lock position.

When the handle of the carrier is located at the release position, the conductive elastic element inside the main body does not interfere with the external device. As a result, an assembly worker can conveniently insert the carrier into a predetermined position in the cage or detach the carrier from the predetermined position in the cage. Accordingly, compared with the prior art, the conductive elastic element of the carrier of the present invention is not easily damaged.

The preferred embodiments of the present invention will now be described in greater detail by referring to the drawings that accompany the present application. It should be noted that the features illustrated in the drawings are not necessarily drawn to scale. Descriptions of well-known components, materials, and process techniques are omitted so as to not unnecessarily obscure the embodiments of the invention. Any devices, components, materials, and steps described in the embodiments are only for illustration and not intended to limit the scope of the present invention.

Basic Structure of Carrier

Figure 3A:
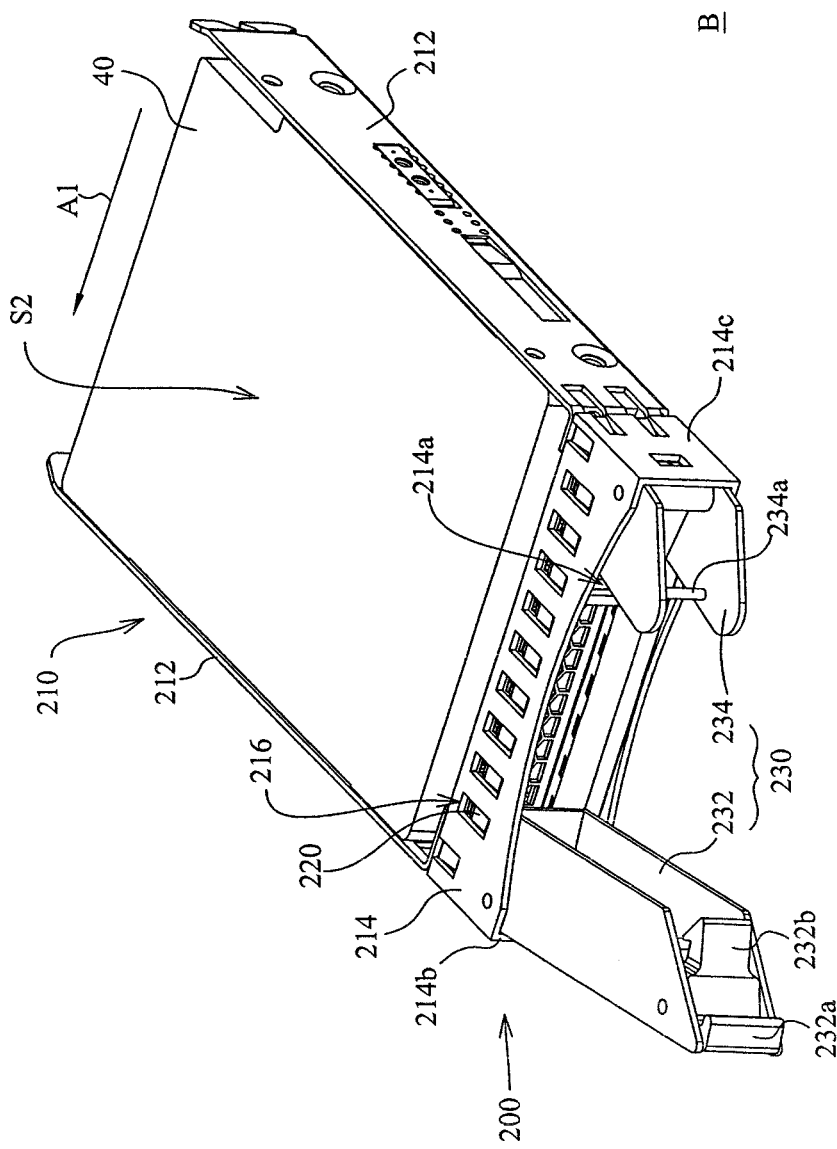
FIG. 3A is a perspective view of a carrier carrying an electronic device with a handle located at a release position according to an embodiment of the present invention.
Figure 3B:
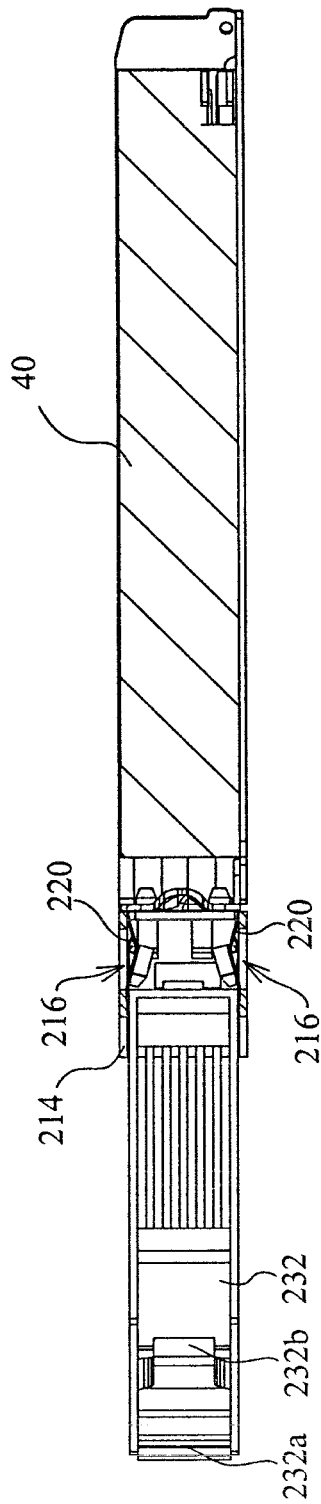
FIG. 3B is a cross-sectional side view of the carrier of FIG. 3A carrying the electronic device.
Figure 3C:
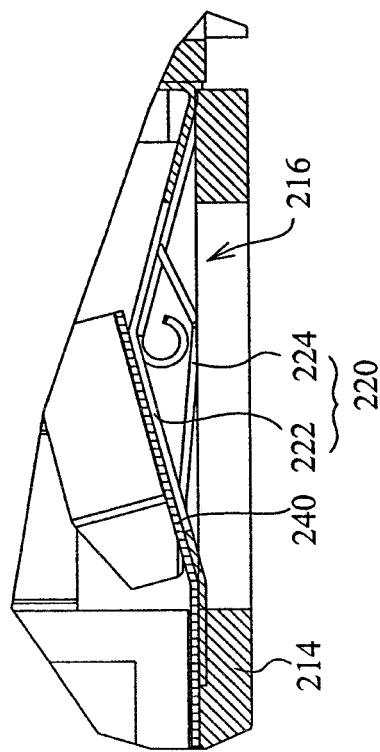
FIG. 3C is an enlarged view of one of the conductive elastic elements of FIG. 3B.

FIG. 3A is a perspective view of a carrier carrying an electronic device with a handle located at a release position according to an embodiment of the present invention. FIG. 3B is a cross-sectional side view of the carrier of FIG. 3A carrying the electronic device. FIG. 3C is an enlarged view of one of the conductive elastic elements of FIG. 3B. Referring to FIG. 3A, FIG. 3B, and FIG. 3C, in this embodiment, a carrier 200 is adapted to carry an electronic device 40. The electronic device 40 is preferably, for example, a hard disk drive or an optical disk drive. The carrier 200 and the electronic device 40 together form an assembly body B. The carrier 200 comprises a main body 210, at least one conductive elastic element 220 (wherein a plurality of conductive elastic elements are shown in FIG. 3A), a handle 230, and a pressing element 240.

The main body 210 is adapted to carry the electronic device 40 and comprises two holding members 212, a connecting member 214, and at least one cavity 216 (wherein a plurality of cavities are shown in FIG. 3A). The openings of the cavities 216 are directed upward and/or downward. The connecting member 214 connects the holding members 212 and has an engaging hole 214a. The holding members 212 are disposed opposite to each other. The electronic device 40, such as a hard disk drive, is disposed inside an accommodating space S2 formed by the connecting member 214 and the holding members 212. Furthermore, the cavities 216 are located in the connecting member 214 of the main body 210. In this embodiment, the shape of the main body 210 is illustrative, rather than restrictive, of the present invention, and thus any design of carrying the electronic device 40 is applicable to the present invention. For example, in another embodiment, the main body 210 may further comprise a bottom board (not shown) connecting the holding members 212 and located beneath the electronic device 40.

Conductive Elastic Element

Referring to FIG. 3A, FIG. 3B, and FIG. 3C, the conductive elastic elements 220 are disposed in the connecting member 214 of the main body 210 and located in the cavities 216, respectively. In this embodiment, each of the conductive elastic elements 220 comprises a first flexible bending portion 222 and a second flexible bending portion 224, wherein the second flexible bending portion 224 is connected to the first flexible bending portion 222. In this embodiment, the conductive elastic elements 220 are used for preventing electromagnetic interference (EMI).

Pressing Element

Referring to FIG. 3A, FIG. 3B, and FIG. 3C, in particular, in the embodiment of the present invention, the pressing element 240 is disposed in the connecting member 214 of the main body 210, and the pressing element 240 contacts the first flexible bending portion 222 of each of the conductive elastic elements 220. In this embodiment, the pressing element 240 is, for example, a bending strip and extends in the direction A1 shown in FIG. 3A (i.e., extends in a direction perpendicular to the paper surface of FIGS. 3B and 3C).

Handle

Referring to FIG. 3A, FIG. 3B, and FIG. 3C, the handle 230 is pivotally connected to the connecting member 214 of the main body 210. In this embodiment, the handle 230 may have a first pivoting portion 232 and a second pivoting portion 234 which are in the vicinity of two opposing side walls 214b, 214c of the connecting member 214, respectively. The first pivoting portion 232 has a first engaging hook 232a and a second engaging hook 232b. The second pivoting portion 234 has an engaging post 234a. The engaging post 234a improves the structural strength of the second pivoting portion 234. When the handle 230 is at the release position shown in FIG. 3A, the handle 230 does not lock the engaging hole 214a of the connecting member 214 of the main body 210 and thus does not exert force on the conductive elastic elements 220, and the conductive elastic elements 220 remain inside the connecting member 214 of the main body 210.

Functioning of the Carrier

Figure 4A:
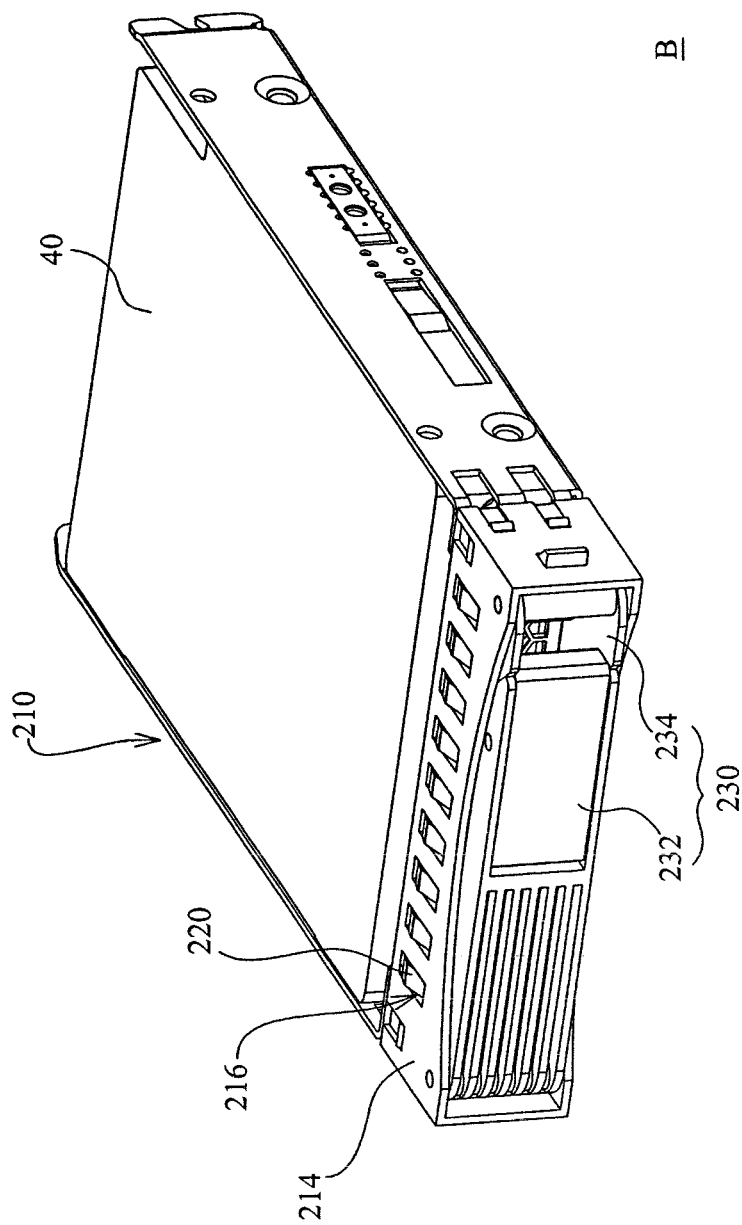
FIG. 4A is a perspective view of the carrier carrying the electronic device with the handle located at a lock position in this embodiment.
Figure 4B:
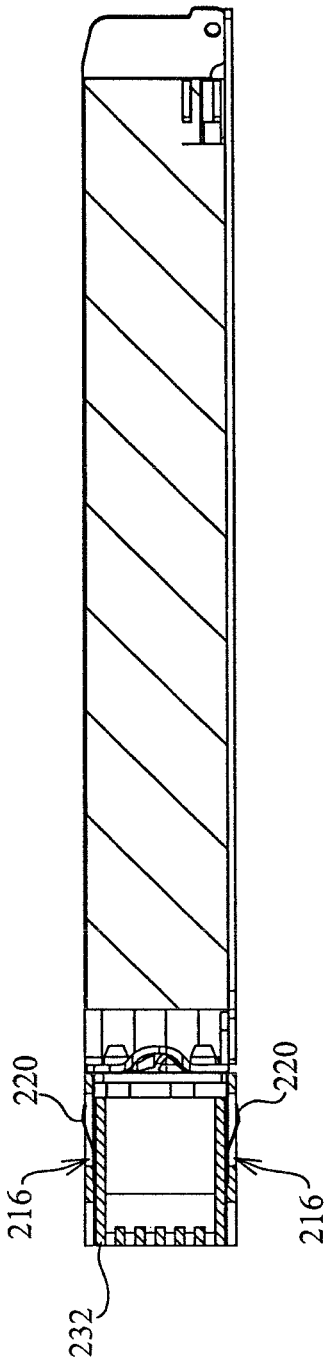
FIG. 4B is a cross-sectional side view of the carrier of FIG. 4A carrying the electronic device.
Figure 4C:
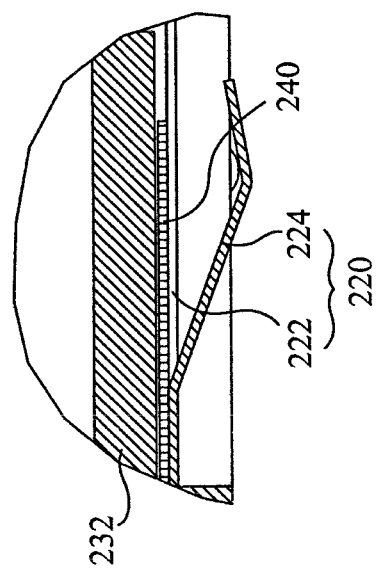
FIG. 4C is an enlarged view of one of the conductive elastic elements of FIG. 4B.

FIG. 4A is a perspective view of the carrier carrying the electronic device with the handle located in a lock position in this embodiment. FIG. 4B is a cross-sectional side view of the carrier of FIG. 4A carrying the electronic device. FIG. 4C is an enlarged view of one of the conductive elastic elements of FIG. 4B. Referring to FIG. 4A, FIG. 4B, and FIG. 4C, when the handle 230 locks the main body 210 to be at the lock position shown in FIG. 4A, the handle 230 exerts force on the conductive elastic elements 220, such that each of the conductive elastic elements 220 protrudes outside the main body 210 through a corresponding cavity 216.

Specifically, when the handle 230 is in the lock position shown in FIG. 4A, the first engaging hook 232a (shown in FIG. 3A) of the first pivoting portion 232 of the handle 230 locks the engaging post 234a (shown in FIG. 3A) of the second pivoting portion 234, and the second engaging hook 232b (shown in FIG. 3A) of the first pivoting portion 232 locks the engaging hole 214a (shown in FIG. 3A) of the connecting member 214 of the main body 210, that is, the first pivoting portion 232 locks the second pivoting portion 234 and the main body 210. At this time, the handle 230 exerts force on the pressing element 240, such that the pressing element 240 presses the conductive elastic elements 220.

Specifically, when the handle 230 is at the lock position shown in FIG. 4A, the first pivoting portion 232 exerts force on a portion of the conductive elastic elements 220 through the pressing element 240, and the second pivoting portion 234 exerts force on another portion of the conductive elastic elements 220 through the pressing element 240. At this time, the bending status of the first flexible bending portion 222 of each of the conductive elastic elements 220 changes, and the second flexible bending portion 224 of each of the conductive elastic elements 220 protrudes outside the main body 210 through the corresponding cavity 216.

It should be noted that, because the pressing element 240 is a strip, the pressing element 240 almost either presses the conductive elastic elements 220 simultaneously or does not press the conductive elastic elements 220 simultaneously whenever the handle 230 switches from the release position to the lock position or from the lock position to the release position. In another embodiment, the pressing element 240 can be omitted. In yet another embodiment, the handle 230 can only have the first pivoting portion 232 which has a relatively large length such that the handle 230 will press all the conductive elastic elements 220 if the handle 230 is at the lock position. In a further embodiment, the shape of each of the conductive elastic elements 220 can be designed to be another shape.

Host Device

Figure 5:
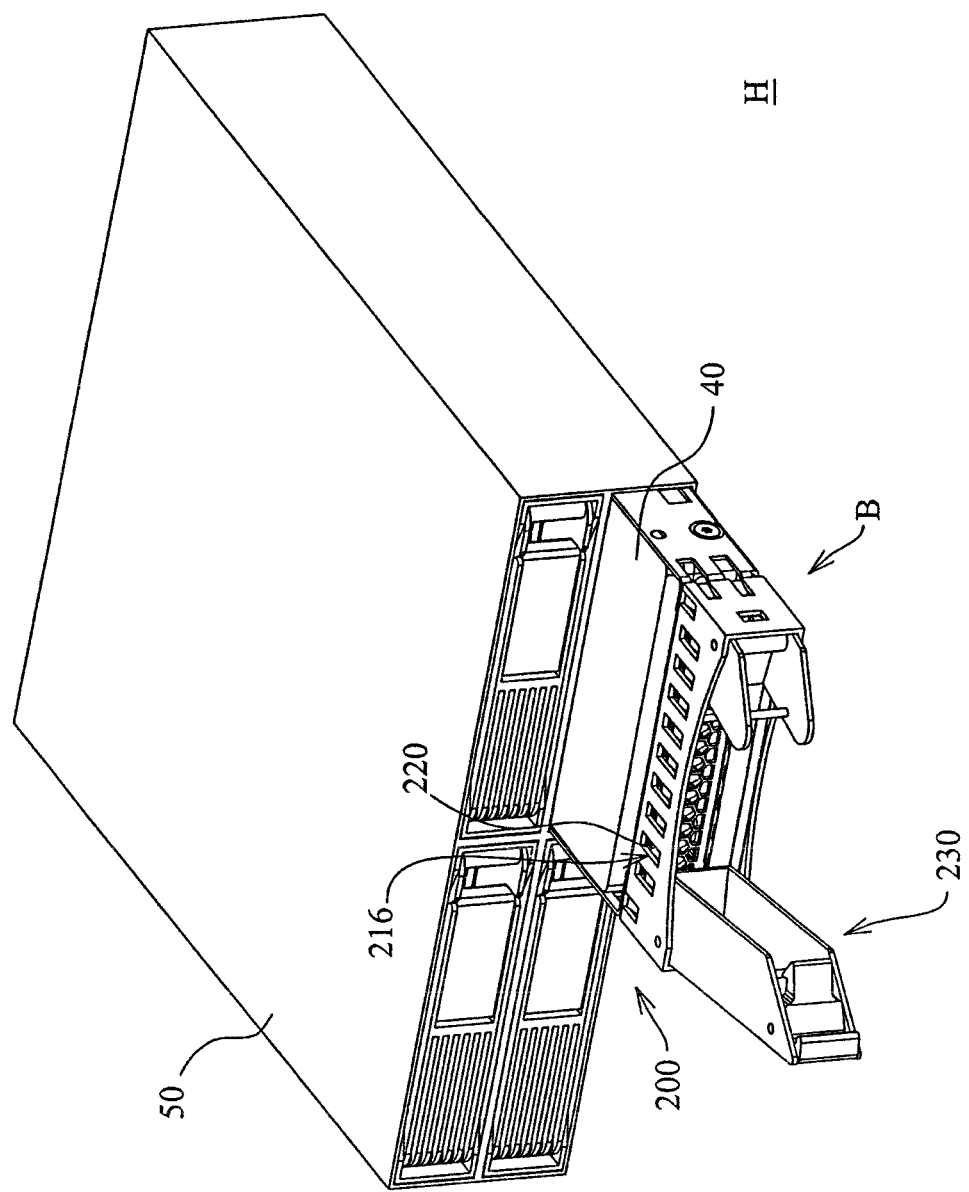
FIG. 5 is a perspective view of a host in this embodiment.

FIG. 5 is a perspective view of a host in this embodiment. Referring to FIG. 3A, FIG. 4A, and FIG. 5, a host H comprises a cage 50 and a plurality of the assemblies B. The cage 50 can accommodate a plurality of the assemblies B. For example, there are four of the assemblies B in FIG. 5. As shown in FIG. 5, the assemblies B are detachably disposed in the cage 50. The handle 230 of the lower right carrier 200 is located at the release position, such that the conductive elastic elements 220 in the connecting member 214 of the main body 210 do not interfere with the cage 50. Accordingly, an assembly worker can conveniently insert the assemblies B into a predetermined position in the cage 50 and then close the handle 230 to the lock position, or detach the handle 230 from the predetermined position in the cage 50. Accordingly, compared with the prior art, the conductive elastic elements 220 of the carrier 200 in this embodiment of the present invention are not easily damaged. In addition, the conductive elastic elements 220 that are part of the connecting member 214 of the main body 210 do not interfere with the cage 50 when the handle 230 of the carrier 200 is in the release position. Compared with the prior art, a predetermined clearance between the cage 50 and each of the carriers 200 of the present invention is relatively smaller. Accordingly, on the whole, the cage 50, which is designed to accommodate the carriers 200 of the present invention, may occupy a relatively small space.

Also, as shown in FIG. 5, another carrier 200 (such as the upper carrier 200) in the cage 50 has a handle 230 located in the lock position. Accordingly, the conductive elastic elements 220 of that carrier are compressed, and thus the second flexible bending portion 224 of each of the conductive elastic elements 220 contacts the cage 20 so as to prevent electromagnetic interference (EMI).

In conclusion, the carrier, the host device (cage), and the method of assembling the host according to an embodiment of the present invention have at least one of the advantages described below or other advantages:

1. When the handle of the carrier is located at the release position, the conductive elastic elements inside the main body do not interfere with the cage. Therefore, an assembly worker can conveniently insert the carrier into a predetermined position in the cage or detach the carrier from the predetermined position in the cage. Accordingly, compared with the prior art, the conductive elastic elements of the carrier of the present invention are not easily damaged.

2. When the handle of the carrier is located at the release position, the conductive elastic elements inside the main body do not interfere with the cage; hence, compared with the prior art, the predetermined clearance between the cage and the carrier can be relatively smaller. Accordingly, on the whole, the cage designed to accommodate the carrier of the present invention occupies relatively small space.

The foregoing embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A carrier for carrying an electronic device, comprising:
   a main body being adapted to carrying the electronic device and having at least one cavity;
   a plurality of conductive elastic elements disposed at the cavity; and
   a pressing element disposed in the main body and in contact with the plurality of conductive elastic elements,
   a handle having a first pivoting portion pivotally coupled to the main body at a first pivot point and a second pivoting portion pivotally coupled to the main body at a second pivot point, wherein when the handle locks the main body to be located at a lock position, the first pivoting portion locks the second pivoting portion and the main body, and both of the first pivoting portion and the second pivoting portion exert force on the pressing element to press the conductive elastic elements and cause the conductive elastic elements to protrude outside the main body through the cavity, and when the handle does not lock the main body and does not exert force on the pressing element to press the conductive elastic elements, the conductive elastic elements are located inside the main body.

2. The carrier of claim 1,
   wherein the main body has a plurality of the cavities, wherein each cavity is aligned with one of the conductive elastic elements, and when the handle is in the lock position, the conductive elastic elements protrude outside the main body through the plurality of cavities.

3. The carrier of claim 1, wherein the conductive elastic element comprises a first flexible bending portion and a second flexible bending portion connected to the first flexible bending portion, and when the handle is at the lock position, the bending status of the first flexible bending portion changes and the second flexible bending portion protrudes outside the main body through the cavity.

4. The carrier of claim 1, wherein the main body comprises two holding members and a connecting member, the connecting member connects the holding members, the holding members are disposed opposite to each other, the connecting member and the holding members form an accommodating space adapted to receive the electronic device, the cavity is located in the connecting member, the conductive elastic element is disposed in the connecting member, and the handle is pivotally coupled to the connecting member.

5. The carrier of claim 1, wherein the first pivot point and the second pivot point are positioned near opposing side walls.

6. The carrier of claim 1, wherein the main body includes an engaging hole, wherein the first pivoting portion of the handle includes first and second engaging hooks, wherein the second pivoting portion of the handle includes an engaging post, and when the handle is in the lock position, the first engaging hook locks the engaging post and the second engaging hook locks the engaging hole.

7. The carrier of claim 1, wherein the first pivoting portion of the handle is longer than the second pivoting portion of the handle.

8. The carrier of claim 1, wherein the pressing element is a strip that presses the conductive elastic elements simultaneously.

9. A host, comprising:
   a cage; and
   at least one assembly detachably disposed in the cage, the at least one assembly comprising an electronic device and a carrier, wherein the carrier comprises:
   a main body being adapted to carrying the electronic device and having at least one cavity;
   a plurality of conductive elastic elements disposed at the cavity;

a pressing element disposed in the main body and in contact with the plurality of conductive elastic elements; and a handle having a first pivoting portion pivotally coupled to the main body at a first pivot point and a second pivoting portion pivotally coupled to the main body at a second pivot point, wherein when the handle locks the main body to be located at a lock position, the first pivoting portion locks the second pivoting portion and the main body, and both of the first pivoting portion and the second pivoting portion exert force on the pressing element to press the conductive elastic elements and cause the conductive elastic elements to protrude outside the main body through the cavity, and when the handle does not lock the main body and does not exert force on the pressing element to press the conductive elastic elements, the conductive elastic elements are located inside the main body.

10. The host of claim 9, wherein the main body has a plurality of the cavities, wherein each cavity is aligned with one of the conductive elastic elements, and when the handle is in the lock position, the conductive elastic elements protrude outside the main body through the plurality of cavities.

11. The host of claim 9, wherein the conductive elastic element comprises a first flexible bending portion and a second flexible bending portion connected to the first flexible bending portion, and when the handle is at the lock position, the bending status of the first flexible bending portion changes and the second flexible bending portion protrudes outside the main body through the cavity.

12. The host of claim 9, wherein the main body comprises two holding members and a connecting member, the connecting member connects the holding members, the holding members are disposed opposite to each other, the connecting member and the holding members form an accommodating space to receive the electronic device, the cavity is located in the connecting member, the conductive elastic element is disposed in the connecting member, and the handle is pivotally coupled to the connecting member.

13. The host of claim 9, wherein the first pivot point and the second pivot point are positioned near opposing side walls.

14. The host of claim 9, wherein the main body includes an engaging hole, wherein the first pivoting portion of the handle includes first and second engaging hooks, wherein the second pivoting portion of the handle includes an engaging post, and when the handle is in the lock position, the first engaging hook locks the engaging post and the second engaging hook locks the engaging hole.

15. The host of claim 9, wherein the first pivoting portion of the handle is longer than the second pivoting portion of the handle.

16. The host of claim 9, wherein the pressing element is a strip that presses the conductive elastic elements simultaneously.

\* \* \* \* \*